(12) United States Patent
Kesling et al.

(10) Patent No.: US 9,912,423 B2
(45) Date of Patent: Mar. 6, 2018

(54) SYSTEM AND METHOD FOR MOBILE COMMERCE

(75) Inventors: Patricia Kesling, Vienna, VA (US); Richard Michalski, Frederick, MD (US); Paul Marko, Pembroke Pines, FL (US); Craig Wadin, Sunrise, FL (US); Stelios Patsiokas, Coral Springs, FL (US)

(73) Assignee: Sirius XM Radio Inc., New York, NY (US)

(*) Notice: Subject to any disclaimer, the term of this patent is extended or adjusted under 35 U.S.C. 154(b) by 903 days.

(21) Appl. No.: 12/167,295

(22) Filed: Jul. 3, 2008

(65) Prior Publication Data
US 2008/0268773 A1    Oct. 30, 2008

Related U.S. Application Data

(60) Division of application No. 09/867,687, filed on May 31, 2001, now abandoned, which is a (Continued)

(51) Int. Cl.
*H04H 40/90*    (2008.01)
*G06Q 30/02*    (2012.01)
(Continued)

(52) U.S. Cl.
CPC .............. *H04H 40/90* (2013.01); *G06Q 30/02* (2013.01); *H04H 60/37* (2013.01); *H04H 60/63* (2013.01);
(Continued)

(58) Field of Classification Search
CPC ........ H04H 40/90; H04H 60/37; H04H 60/63; H04L 29/06; H04L 67/04; H04L 67/12; H04L 67/20; H04L 69/329; G06Q 30/02
(Continued)

(56) References Cited

U.S. PATENT DOCUMENTS 4,780,906 A    10/1988  Rajasekaran et al.
4,926,486 A *   5/1990  Barsumian .................... 381/152
(Continued)

FOREIGN PATENT DOCUMENTS

EP    0986200        3/2000
EP    0986200 A2     3/2000
(Continued)

OTHER PUBLICATIONS www.emarker.com, "About eMarker", Mar. 27, 2001.
(Continued)

*Primary Examiner* — Raymond Dean
(74) *Attorney, Agent, or Firm* — Krame Levin Naftalis & Frankel LLP

(57) ABSTRACT

A system for and method of implementing mobile commerce in a satellite radio broadcasting system. A unique program identifier is associated with each program segment of a broadcast. When a listener hears a program segment of interest, the listener causes the associated program identifier to be captured and thereafter to be transferred to a central location or hub. The transferring operation can be accomplished manually, via a media link or via a wireless network. Upon receipt of the program identifier at the central hub, the program identifier is used to determine information about the listener, obtain additional information regarding the program segment associated with the program identifier for the listener and/or initiate an e-commerce transaction involving the listener and/or other parties including merchandisers and advertisers.

31 Claims, 5 Drawing Sheets

Related U.S. Application Data continuation-in-part of application No. 09/461,699, filed on Dec. 14, 1999, now Pat. No. 7,010,263.

(51) Int. Cl.

| | | |
|---|---|---|
| *H04H 60/37* | (2008.01) | |
| *H04H 60/63* | (2008.01) | |
| *H04L 29/06* | (2006.01) | |
| *H04L 29/08* | (2006.01) | |

(52) U.S. Cl.
CPC ............. *H04L 29/06* (2013.01); *H04L 67/04* (2013.01); *H04L 67/12* (2013.01); *H04L 67/20* (2013.01); *H04L 69/329* (2013.01)

(58) Field of Classification Search
USPC ............. 455/3.01–3.06, 12.1–12.3, 427–430
See application file for complete search history.

(56) References Cited

U.S. PATENT DOCUMENTS

| | | | |
|---|---|---|---|
| 5,063,610 A | | 11/1991 | Alwadish |
| 5,282,028 A | | 1/1994 | Johnson et al. |
| 5,303,393 A | * | 4/1994 | Noreen et al. ............... 455/3.02 |
| 5,587,889 A | | 12/1996 | Sacherman |
| 5,761,071 A | | 6/1998 | Bernstein et al. |
| 5,784,095 A | | 7/1998 | Robbins et al. |
| 5,793,866 A | * | 8/1998 | Brown et al. ...................... 380/2 |
| 5,835,607 A | * | 11/1998 | Martin et al. ................ 381/94.1 |
| 5,864,579 A | | 1/1999 | Briskman |
| 5,887,247 A | | 3/1999 | Baltus et al. |
| 5,905,865 A | | 5/1999 | Palmer et al. |
| 5,907,793 A | | 5/1999 | Reams |
| 5,915,020 A | | 6/1999 | Tilford et al. |
| 5,937,390 A | | 8/1999 | Hyodo |
| 6,007,562 A | | 12/1999 | Harren et al. |
| 6,157,823 A | | 12/2000 | Fougnies et al. |
| 6,178,407 B1 | * | 1/2001 | Lotvin et al. ............. 705/14.73 |
| 6,199,076 B1 | | 3/2001 | Logan et al. |
| 6,201,798 B1 | | 3/2001 | Campanella et al. |
| 6,314,577 B1 | * | 11/2001 | Pocock ........................... 725/93 |
| 6,380,923 B1 | | 4/2002 | Fukumoto et al. |
| 6,381,454 B1 | * | 4/2002 | Tiedemann et al. .......... 455/419 |
| 6,397,076 B1 | | 5/2002 | Brown et al. |
| 6,407,750 B1 | * | 6/2002 | Gioscia et al. ............... 715/716 |
| 6,466,765 B1 | | 10/2002 | Tanaka et al. |
| 6,507,764 B1 | | 1/2003 | Parrella et al. |
| 6,628,928 B1 | | 9/2003 | Crosby et al. |
| 6,925,489 B1 | | 8/2005 | Curtin |
| 7,039,599 B2 | * | 5/2006 | Merriman et al. ......... 705/14.52 |
| 7,274,905 B1 | | 9/2007 | Nguyen et al. |
| 7,274,906 B1 | | 9/2007 | Nguyen et al. |
| 2001/0018668 A1 | | 8/2001 | Yanase et al. |
| 2001/0037232 A1 | | 11/2001 | Miller |
| 2001/0056369 A1 | | 12/2001 | Takayama et al. |
| 2002/0026380 A1 | | 2/2002 | Su |
| 2002/0046084 A1 | | 4/2002 | Steele et al. |
| 2002/0053077 A1 | | 5/2002 | Shah-Nazaroff et al. |
| 2002/0095331 A1 | | 7/2002 | Osman et al. |
| 2002/0102993 A1 | | 8/2002 | Hendrey et al. |
| 2002/0107736 A1 | | 8/2002 | Mizuno et al. |
| 2002/0183059 A1 | * | 12/2002 | Noreen et al. ................ 455/427 |
| 2006/0223507 A1 | * | 10/2006 | Kawamoto ................ 455/414.1 |

FOREIGN PATENT DOCUMENTS

| | | |
|---|---|---|
| JP | 408307294 | 11/1996 |
| WO | WO9735432 | 9/1997 |
| WO | WO9750250 | 12/1997 |
| WO | WO0127790 A1 | 4/2001 |

OTHER PUBLICATIONS www.starcd.com, "Frequently Asked Questions", Mar. 28, 2001.
www.buzzhits.com, "Welcome to BuzzHits.com", Mar. 28, 2001.
www.xenote.com, "Xenote", Mar. 27, 2001.
www.emarker.com, "Frequently Asked Questions", Mar. 27, 2001.
www.news.cnet.com, "Sony Device Bookmarks Music Heard on Radio", Mar. 27, 2001.

* cited by examiner

| PROGRAM ID | PROGRAM DESCRIPTION | TIME | CHANNEL |
|---|---|---|---|
| | | | |
| | | | |
| | | | |
| | | | |
| | | | |
| | | | |
| | | | |

SYSTEM AND METHOD FOR MOBILE COMMERCE

FIELD OF THE INVENTION

This application is a divisional of U.S. application Ser. No. 09/867,687, entitled System and Method for Mobile Commerce, filed May 31, 2001, which is a continuation-in-part application of U.S. application Ser. No. 09/461,699, entitled System and Method for Distributing Music and Data, filed Dec. 14, 1999, both of which are incorporated by reference herein in their entireties.

BACKGROUND

Field of the Invention

The present invention is directed to systems and methods for mobile commerce. More particularly, the present invention is directed to systems for and methods of capturing a program identifier associated with broadcast content and employing the program identifier to obtain further information about products and/or services associated with the broadcast content, to purchase products and/or services associated with the broadcast content and to provide interactive feedback with respect to the broadcast content to broadcast controllers and other parties. The present invention is also directed to methods of generating revenue within a mobile commerce context.

Background of the Invention

Presently, music and information are widely disseminated through two primary methodologies: 1) broadcast channels (e.g., radio and television) and 2) distribution of physical storage media (books, tapes, CDs, etc.). While broadcast channels offer a rich variety of content along with freedom of motion, the user does not have program control over the content being broadcast. Further, there is no permanent storage of the content being broadcast without the use of a storage device, and even if such a storage device were widely available, such recording may be illegal. Accordingly, it is common practice to maintain a library of physical storage media (e.g., CDs) allowing for use or enjoyment of the content stored therein at a time of the user's choosing.

The distribution of physical storage media (books, tapes, records, CDs, etc.) is currently a costly process. Music distribution, for example, begins with the storage of the music on a master disc from which copies are made for distribution. The copies are stored on CDs, tapes or other conventional music storage medium and each copy is labeled and placed in a package. Packages are typically preprinted in full-color to provide information with respect to the artist, the title of the work, the content of work, the name of the distributor, etc. In addition, the packaging is often designed artistically in a way that is consistent with the genre of the selection and is attractive to consumers. All of these features add to the considerable cost associated with the conventional method for distributing music.

Hence, a need existed in the art for an inexpensive system or method for distributing music, information and other content on physical storage media in accordance with the desires of the end user in a legal manner that does not violate the rights of the content providers and/or artists. A solution to this need is described in U.S. patent application Ser. No. 09/461,699, filed Dec. 14, 1999, by S. Patsiokas and entitled SYSTEM AND METHOD FOR DISTRIBUTING MUSIC AND DATA, which is incorporated herein in its entirety by reference.

Patsiokas describes a system for distributing music and content in which music or data is first transmitted to a consumer via a wireless network. In a specific illustrative embodiment, the wireless network is a satellite and terrestrial radio network. The user is provided with a receiver (i.e., a radio) which is capable of receiving the wireless transmission and providing an audio and/or visual output in response thereto. In addition, the receiver is adapted to receive an input from the user by which the user is able to signal an interest in purchasing a selection of music or data being played and/or displayed. In the illustrative embodiment, in response to this signal from the user and a recordability flag transmitted in response to input from a content provider, a program identifier (or "PID") signal, which identifies the selection being played and/or displayed, is stored on a removable media. In the specific illustrative embodiment, the removable media is electronic (flash) memory. The PID signal may be a composite signal indicating the time at which and channel on which the selection was playing, a signal that identifies a selection by number, or other suitable signal. The receiver or the user's home computer may be used to display the title, artist and/or other information based on the user's selections.

The system includes a mechanism for allowing the user to retrieve the desired selection from a second network using the removable media. Several alternatives are provided for the retrieval mechanism. In one embodiment, the retrieval mechanism is a computer, located either in the user's home or in a commercial establishment, through which the user is allowed to access a web site on the World Wide Web or a site on a private distribution hub. In either case, the site provides interface software which translates the program identifier signal into a human readable identification (e.g., title and artist) of the music or data (information) selected. In an alternative embodiment, the computer is provided in a kiosk accessible to the public. The user then either downloads the desired selection through the site or places an order for delivery of physical media (e.g., a CD) on which the desired selection is stored.

While the system described by Patsiokas provides a significant advance over conventional methods and systems for distributing music, there are many other advantages that can be realized from broadcasting music and information via a wireless network, and in particular a satellite broadcast network.

SUMMARY OF THE INVENTION

Accordingly, it is an object of the present invention to provide systems and methods for facilitating mobile commerce.

It is another object of the present invention to provide systems and methods for assigning program identifiers to uniquely identify program selections or segments that are broadcast from one or more satellites and for employing the program identifiers to coordinate transactions between a broadcast listener and a central location.

It is also an object of the present invention to provide systems and methods for ordering merchandise associated with an advertisement, for receiving information and/or for providing feedback with respect to one or more selected program segments.

It is another object of the present invention to provide systems and methods for generating revenue within a mobile commerce context.

The present invention achieves these and other objects by providing a system in which one or more satellites transmit content (preferably in a digital format) to both mobile and fixed receivers on the ground. Each content segment preferably includes a header portion that includes a program identifier. "Program identifier" herein means an identification tag, word, number, etc. that uniquely identifies a content segment, including a single song, a group of songs, an entire album of music, a radio program and/or discrete portions thereof, an advertisement, merchandise described by an advertisement or a particular response or feedback to another party (such as a poll response or response to a broadcast quiz question).

In accordance with an embodiment the present invention, program identifiers are transferred to a storage medium and subsequently passed to a web site on the World Wide Web or to other centralized distribution hub(s) (location, server or processor) from which information and/or products can be disseminated, or at which listener feedback can be collected and analyzed. The feedback function may be used to provide radio "voting," sweepstakes and/or gaming functionality.

In accordance with an exemplary embodiment of the present invention, a studio/uplink site digitally encodes selections of music and/or information and applies a header that includes the program identifier (PID) that uniquely identifies each selection. The program identifier may uniquely identify a selection of music, an advertisement, merchandise associated with an advertisement, or a response or reaction to something that is transmitted to a radio receiver, including both audio, text and/or other visual information.

A user interface on the radio allows the receiver to receive input from the listener/user. The input may indicate an interest in a given selection, i.e., a content segment. In the best mode of the invention, the user interface includes one or more buttons, i.e., a "select" button, which can be pressed to record, select or tag the program identifier associated with the selection of interest. In one embodiment, a removable memory "flash card" media link is used to capture the selected program identifiers. To transfer the captured program identifiers to the central hub, the card is placed in a reader that is associated with a computer that is itself connected to an electronic network. In an alternative embodiment, instead of a "select" button, the radio includes a voice recognition system or other suitable means for receiving input from a listener/user. In still another embodiment of the invention, a wireless link is established upon pressing the "select" button such that captured program identifiers are substantially automatically transferred to the central hub over a wireless link. This latter embodiment eliminates the need for a flash memory card and provides the radio with interesting real-time interactive functionality.

In another embodiment, the present invention does not require additional listener or subscriber involvement beyond that which is normally required to control the radio. The device of the present invention simply registers the channels that the listener chooses and records the program identifiers that are transmitted during the time that the listener is tuned to those channels.

In another embodiment, the listener may indicate either positive interest (or approval) or negative interest (or disapproval) by selecting one of two distinct buttons (e.g., differently shaped or colored buttons). In this case, the device would store the program ID and the button that was pushed.

In another embodiment, a range of listener feedback may be stored along with the program ID. Such feedback could include selecting a response in a multiple-choice question, or even voice feedback.

In another embodiment, multiple content providers or sources (such as AM, FM, or other satellite radio service providers) could be served by a device of the present invention by storing an indication of the content provider as well as the Program ID sent by the content provider (if any).

In still another embodiment, information associated with distinct program segments is broadcast simultaneously with a broadcast that includes program IDs. The information is stored in memory that is associated with the radio. A listener can press a select button on the radio during the broadcast, or at a later time and retrieve the information that is stored, thereby receiving additional content associated with a program segment of interest.

These and other advantages and objects of the present invention will become apparent upon a reading of the following detailed description in conjunction with the accompanying drawings.

While the present invention is described primarily in the context of satellite radio broadcasting, the principles of the present invention are also applicable to any digital broadcast, be it from a space-based, airborne, terrestrial, or combination source.

DETAILED DESCRIPTION OF THE INVENTION

Satellite radio operators will soon provide digital quality radio broadcast services covering the entire continental United States. These services will each offer approximately 100 channels, of which nearly 50 channels will provide music, with the remaining stations offering news, sports, talk and data channels.

Satellite radio has the ability to improve terrestrial radio's potential by offering better audio quality, greater coverage and fewer commercials. Accordingly, in October of 1997, the Federal Communications Commission (FCC) granted two national satellite radio broadcast licenses. The FCC allocated 25 megahertz (MHz) of the electromagnetic spectrum for satellite digital broadcasting, 12.5 MHz of which are owned by "Sirius Satellite Radio" and 12.5 MHz of which are owned by "XM Satellite Radio Inc."

In deploying satellite radio, one system plan includes transmission of program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, thereby providing significant mitigation of multipath interference and addressing reception issues associated with blockage of the satellite signals. Further, in accordance with this particular scheme, the 12.5 MHz band is split into 6 slots. Four slots are used for satellite transmission; the remaining two slots are used for terrestrial reinforcement.

In accordance with the present invention, satellite radio transmission information is transferred to a removable storage medium and passed to the World Wide Web or a centralized distribution hub to provide a novel and advantageous system and method for distributing music, information, and other content within legal means, as well as to provide feedback from satellite radio listeners to one or more parties. A wireless media link is also contemplated by the present invention.

Figure 1:
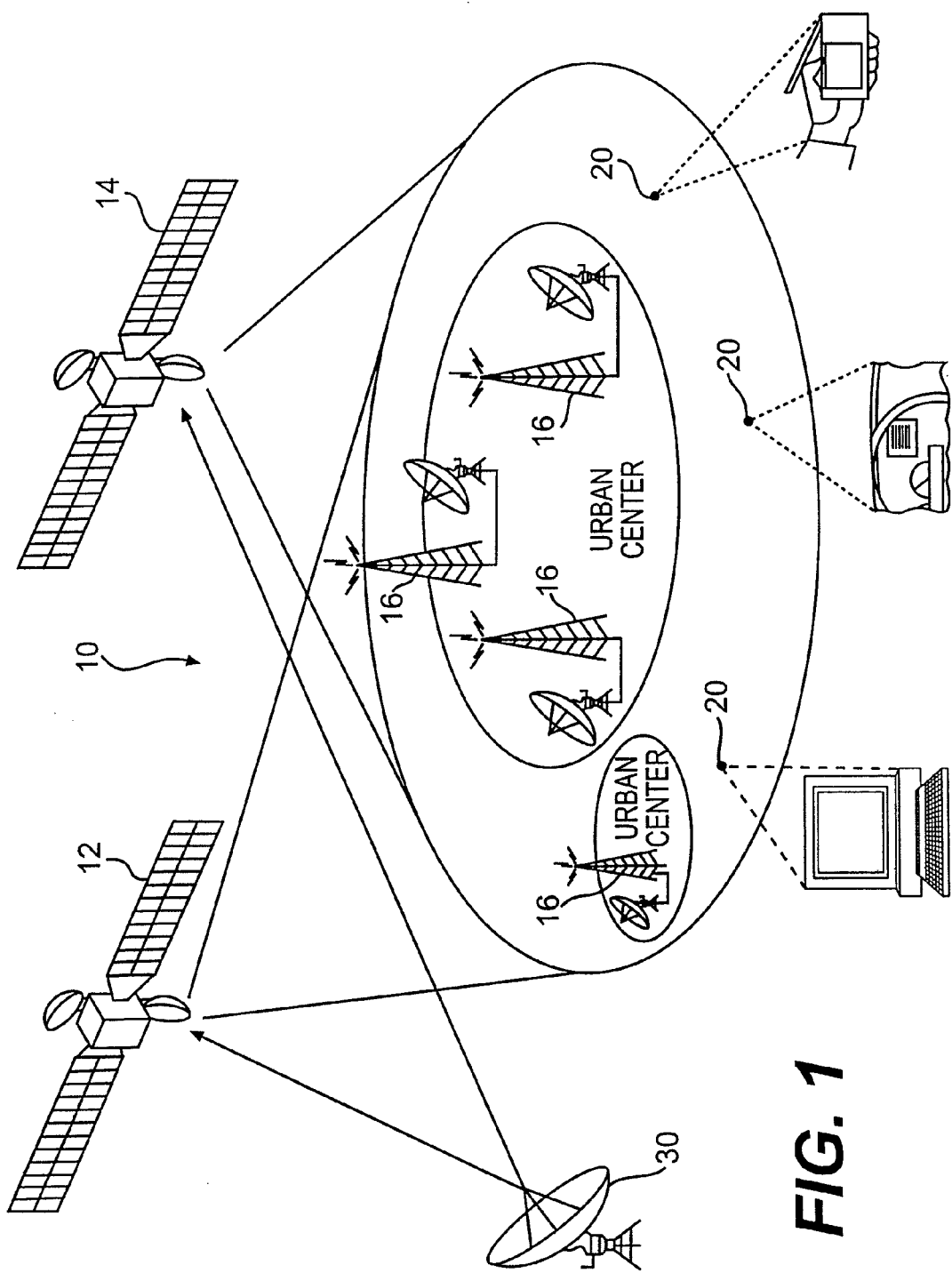
FIG. 1 is a schematic diagram of an illustrative implementation of a satellite digital audio radio service system architecture.
Figure 2:
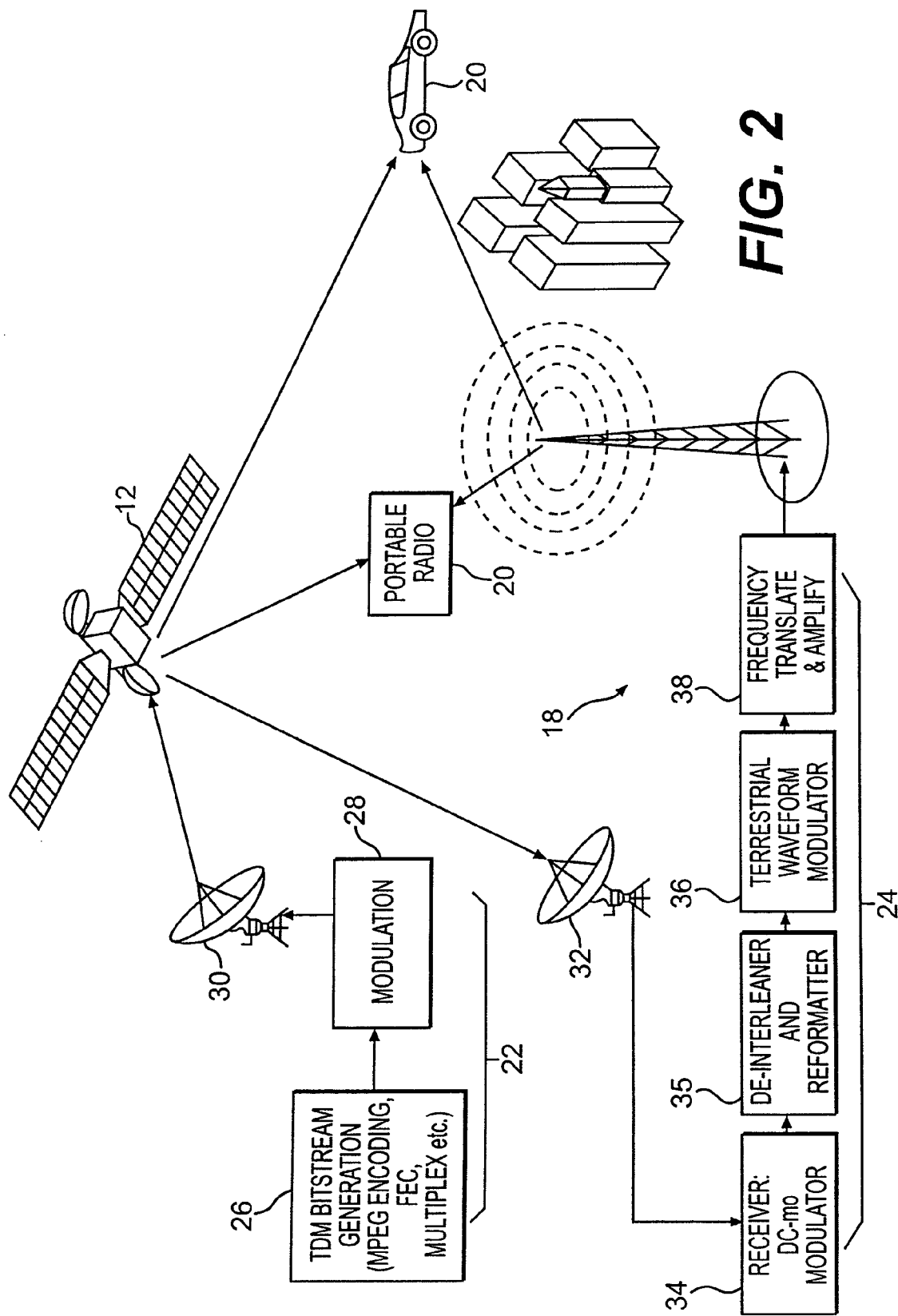
FIG. 2 is a schematic diagram that illustrates the system of FIG. 1 in greater detail.

An illustrative implementation of a satellite digital audio radio service (SDARS) system architecture is depicted in FIGS. 1 and 2. As illustrated in FIG. 1, the system 10 includes first and second geostationary satellites 12 and 14 which transmit line-of-sight (LOS) signals to SDARS receivers located on the surface of the earth. Preferably, the satellites provide for interleaving and spatial diversity. The system 10 further preferably includes multiple terrestrial repeaters 16 which receive and retransmit the satellite signals to facilitate reliable reception in geographic areas where LOS reception from the satellites is obscured by tall buildings, hills, tunnels and other obstructions. The signals transmitted by the satellites 12 and 14 and the repeaters 16 are received by SDARS receivers (or radios) 20. As depicted in FIG. 1, receivers 20 may be located in automobiles, or may be handheld or stationary units for home or office use. Receivers 20 are designed to receive one or both of the satellite signals and/or the signals from the terrestrial repeaters and to combine or to select at least one of the signals to generate the receiver output.

FIG. 2 is a diagram which illustrates system 10 of FIG. 1 in greater detail with a single satellite and a single terrestrial repeater. FIG. 2 shows a broadcast segment 22 and a terrestrial repeater segment 24. In the illustrative embodiment, an incoming bit stream is encoded into a time division multiplexed (TDM) signal using an audio compression scheme (such as MPEG or any other suitable compression scheme) by an encoder 26 of conventional design. The TDM bit stream is upconverted to RF by a conventional quadrature phase-shift keyed (QPSK) modulator 28. The upconverted TDM bit stream is then uplinked to the satellites 12 and 14 by an antenna 30. Those skilled in the art will appreciate that the present invention is not limited to the broadcast segment shown. Other systems may be used to provide signals to the satellites without departing from the scope of the present teachings.

In the illustrative system, the satellites 12 and 14 act as "bent pipes." The satellites translate the frequency of the uplinked signal and retransmit the signal to terrestrial repeaters 18 and portable/mobile radios 20. As illustrated in FIG. 2, the terrestrial repeater includes a receiver demodulator 34, a de-interleaver and reformatter 35, a terrestrial waveform modulator 36 and a frequency translator and amplifier 38. The receiver and demodulator 34 down-converts the down-linked signal to a TDM bit stream. The de-interleaver and reformatter 35 re-orders the TDM bit stream for the terrestrial waveform. The digital baseband signal is then applied to a terrestrial waveform modulator 36 (e.g., MCM or multiple carrier modulator) and then frequency-translated to a carrier frequency prior to transmission. Those skilled in the art will appreciate that satellite systems that make use of on-board processing to demodulate, reformat, remodulate and/or combine multiple uplink signals into a single downlink signal are also considered by this invention.

Figure 3:
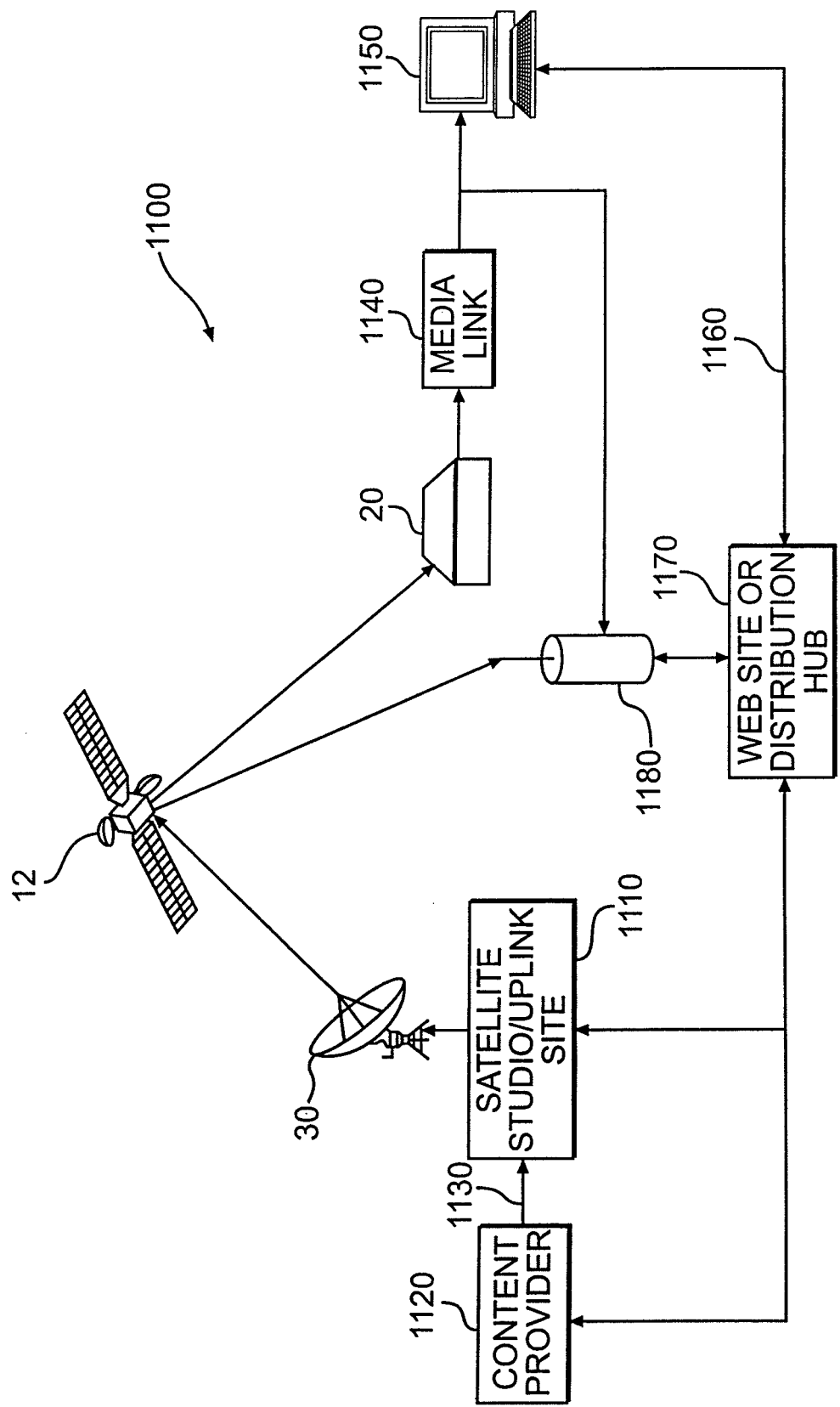
FIG. 3 is a high-level schematic diagram showing an exemplary system for implementing the principles of the present invention.

FIG. 3 is a high-level diagram showing a system 1100 for distributing goods and services, for retrieving information for listeners and for collecting information from listeners in accordance with the principles of the present invention. System 1100 includes a studio/uplink site 1110 that receives program content (e.g., music, information, advertising, etc.) from a content provider 1120 via a feeder link 1130. As will be appreciated by those skilled in the art, the content may be provided electronically or on a physical storage medium such as a compact disc. The studio/uplink site 1110 digitally encodes the selections of music and/or information provided by the content provider 1120 and applies a header that includes a program identifier (PID) that uniquely identifies each selection. The program identifier may uniquely identify a selection of music, an advertisement, merchandise associated with an advertisement, or a category of response or reaction to something that is transmitted to the radio receiver 20, including both audio, text and visual information. The foregoing also applies to systems utilizing multiple uplinks, provided that a PID is applied to all content regardless of the origin of the uplink.

The encoded bit stream along with the header is uplinked from the studio/uplink site 1110 to satellite 12 via antenna 30. As mentioned above, satellite 12 acts as a bent pipe with a frequency translation (e.g., from X band to S band) and retransmits the received signal to a portable/mobile satellite radio receiver 20.

Figures 5, 6:
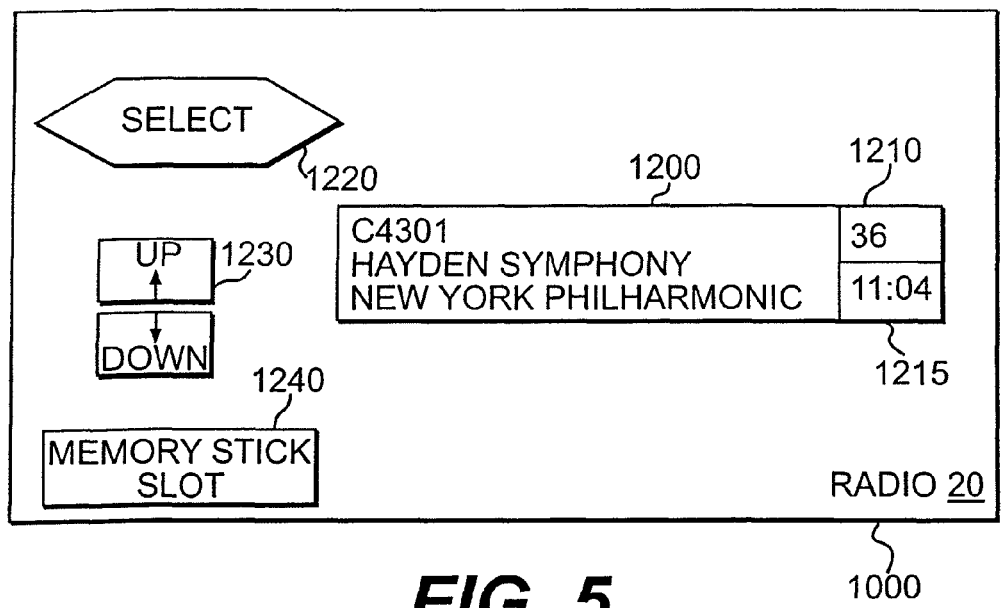
FIG. 5 is a schematic diagram of an exemplary user interface for a radio in accordance with the present invention.
FIG. 6 is an exemplary logical arrangement of a list of content including associated program identifiers.

At any given time, receiver 20 plays any one of a plurality of selections received on the plurality of channels that are selectable by the user via a user interface 1000 (shown in FIG. 5). User interface 1000 also allows the receiver to receive input from a listener/user indicating an interest in a given selection. In a preferred embodiment, the user interface includes one or more buttons that can be pressed to record, select or tag the program identifier associated with the selection of interest. In one embodiment, a removable memory "flash card" media link 1140 is used to capture the selected program identifiers. In an alternative embodiment, radio 20 includes a voice recognition system (not shown) or other suitable means for receiving input from a listener/user. In accordance with the present teachings, when the user desires to receive information or goods, or provide feedback in regard to his selection(s), the user removes media link 1140 from receiver 20 and inserts media link 1140 into a suitable reader (not shown) connected to a computer 1150. Computer 1150 is preferably equipped with a modem by which the user is able to access a second network 1160 and thereby achieve a connection to a web site or central, private distribution hub 1170 designed and configured in accordance with the present teachings.

In an alternative implementation, an intermediate transfer device (such as a laptop computer, personal digital assistant, or cellular telephone with some form of input device) is used to recover the stored program IDs from the memory device in the radio. The intermediate device may be directly linked to the web (in the case of a PDA with a modem or a cellular telephone) or may simply be used to transfer the information from the radio to another computer. The intermediate transfer device could also be a portable computer that is mounted in an automobile, i.e., an "autoPC."

As illustrated in FIG. 3, the user may also take media link 1140 to a computer in a publicly accessible kiosk 1180 or a commercial establishment and access an e-commerce web site from which he can order merchandise associated with an advertisement, or from which he can obtain further information or provide feedback regarding the selection in the manner described above.

Site or hub 1170 preferably provides the user with a software interface which reads the program identifiers from media link 1140 and displays information relating to the desired selection for the user's perusal. In the case of merchandise, for example, the information might include the item being advertised, the price, purchasing options, delivery options, etc. The user is then given the option to order the merchandise, obtain further information, or provide feedback.

Figure 4:
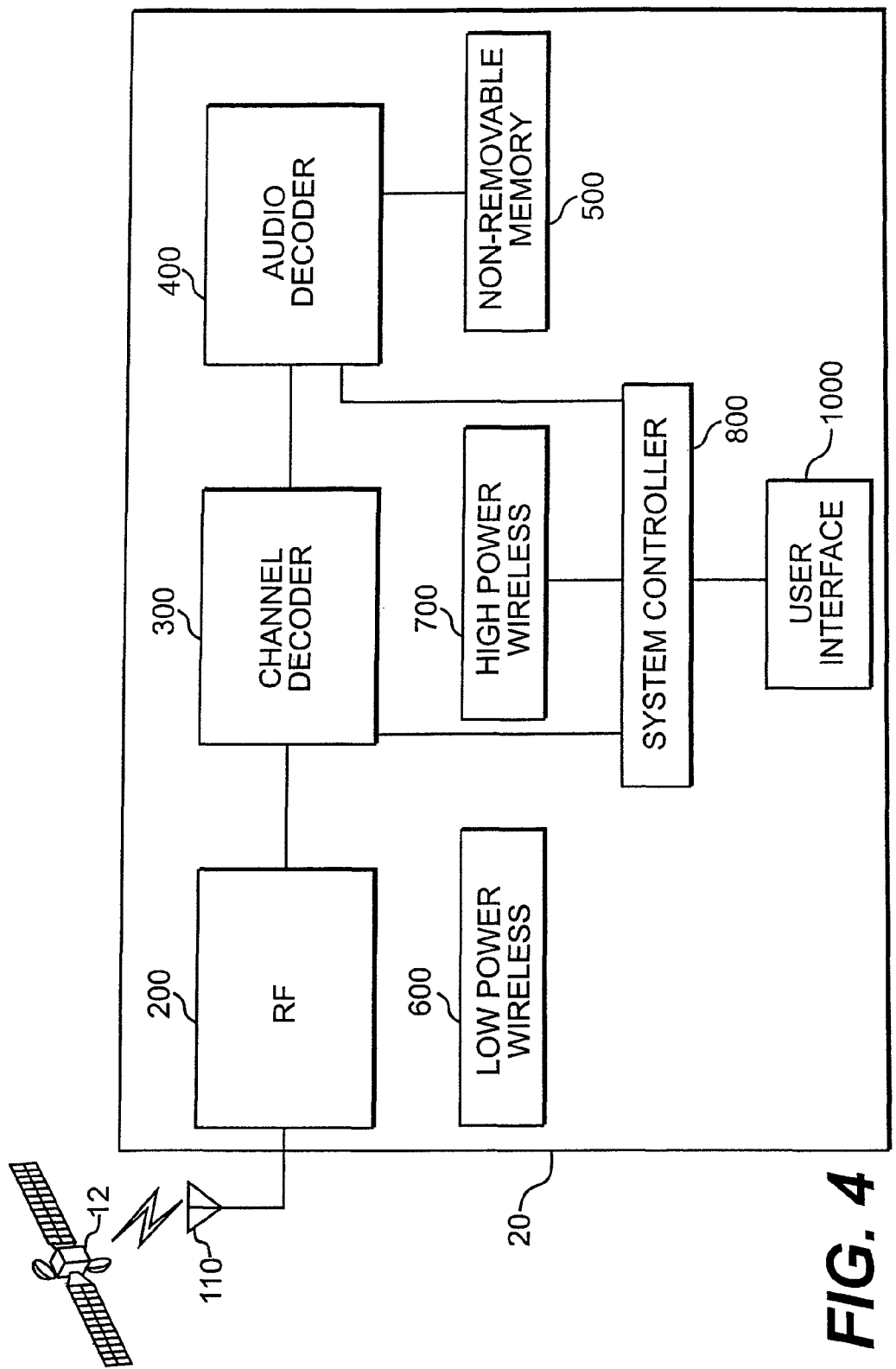
FIG. 4 is a simplified high-level schematic diagram of an exemplary radio receiver operable with the present invention.

As shown in FIG. 4, receiver 20 preferably includes an antenna module 110, an RF tuner module 200, a channel decoder 300, an audio decoder 400, non-removable memory 500, an optional low power wireless transmitter (or transceiver) 600, an optional high power wireless transmitter (or transceiver) 700, a system controller 800 and user interface 1000. Both low and high power devices 600, 700 can be physically separate from radio 20 as long as communication between radio 20 and devices 600, 700 can be effected.

FIG. 5 is a schematic illustration of an exemplary user interface 1000 for radio 20 in accordance with present invention. As shown, there is a display 1200 that preferably displays the program identifier, the title of the program and, where appropriate, the artist and/or any other pertinent information. The channel number 1210 and the time 1215 are also preferably displayed. Of course, the description of displayed information is exemplary in nature only and thus it should be well-understood that not all of the foregoing information necessarily needs to be shown on display 1200. Display 1200 may be any conventional, well-known display such as a liquid crystal display or any other suitable display. A "select" button 1220 is provided and is pressed, activated or operated by a listener to indicate an interest in a particular program segment or selection. The use and effect of select button 1220 will be explained in more detail below.

A scroll button 1230 permits scrolling through program identifiers that have been previously tagged or selected, or have otherwise been stored in nonremovable memory 500. A slot 1240 may be provided for flash card memory, i.e., media link 1140. Alternatively, low power wireless transmitter 600 (e.g., an infrared transmitter or RF transmitter in accordance with the Bluetooth standard or other suitable well-known technology) may be employed to transfer information, namely, program identifiers, from radio 20 to media link 1140, which, again, may be a flash memory or, as another example, a "Plug & Play" device manufactured by SONY Inc., Japan. As explained, media link 1140 is used for capturing selected program identifiers associated with program segments that are of interest to the user. In accordance with the present invention, media link 1140 is not limited to a physical device, but can be replaced by wireless link to computers or web sites as will be explained in more detail below.

In still another or combination embodiment, radio 20 includes a high power wireless transmitter 700 (shown in FIG. 4), which preferably operates using technology, protocols and electromagnetic spectrum allotted to, for example, well-known text paging systems (e.g., the well-known Mobitex network operated by Cingular Wireless, Atlanta, Ga.) or short messaging systems embodied in cellular telephones networks. Thus, in this case, media link 1140 of FIG. 3 is replaced by a wireless transmission link.

FIG. 6 shows an exemplary table of information that is stored at least in non-removable memory 500, and potentially also stored in a physical media link 1140 and/or transmitted via high power wireless transmitter 700. In one embodiment of the present invention, information about each program that is listened to on radio 20 is stored in non-removable memory 500 in a format consistent with that of the table of FIG. 6. In another embodiment, only a subset of the type of information listed in the table of FIG. 6 is recorded. For example, only program identifiers that are associated with program content that has been selected by a user are recorded. In other words, the table of FIG. 6 is for illustrative purposes only and is not intended to limit the scope of the present invention.

Generally, pressing select button 1220 indicates that the listener is interested in or desires to provide feedback to content that is being broadcast. The content is uniquely identified by the program identifier associated with the content being broadcast at that time. The unique identifier is passed back to a central location such as web site 1170 (FIG. 3) where it is acted upon appropriately.

For example, if the program identifier identifies a particular song and artist, the web site preferably provides information regarding how the listener can obtain or purchase a copy of a compact disc (CD) on which the music selection(s) can be found, or how the listener may purchase a custom compact disc (or other storage medium) containing copies of the specific track or tracks that were selected. Similarly, if the program identifier identifies an advertisement for a type of automobile, then when the web site receives the program identifier from the user, information regarding that automobile is made available to the user, either directly or through a link (pointer) to another web site.

In accordance with the present invention, there are several implementations via which unique identifiers can be captured by a listener/user of a radio receiver 20. These implementations include, but are not limited to, a physical media link or memory device as described thus far. Further implementations are described below.

Manual Retrieval:

There are a number of ways in which manual program identifier retrieval can be accomplished. First, if the unique identifier of the selection of interest is displayed on display 1200, then the listener can simply write down the program identifier using pen and paper and input the program identifier (at a later time) into a computer that is connected with, e.g., central hub or web site 1170.

If the listener is driving a car, however, it may be hazardous to write something down on paper. To avoid such dangerous activity, the listener may instead press select button 1220 when content of interest is played on radio 20. The program identifier (at least) associated with that content is then stored in non-removable memory 500. When the listener has stopped driving, he may then scroll through the program identifiers (along with any other related information listed in the table of FIG. 6) using scroll button 1230. He can then write down the program identifiers that are still of interest to him.

Alternatively, radio 20 can be configured to store or record a list (like that shown in FIG. 6) of all content that has been listened to. Such a list is preferably arranged in accordance with a first-in-first-out (FIFO) format so that the most recent content segments are listed first. Also, radio 20 can be configured to list program identifiers associated with content segments that were listened to for more than a predetermined amount of time, e.g., 5 seconds, thereby avoiding an unmanageable list of program identifiers. In accordance with this alternative embodiment, the listener can always return to the "play list" to decide whether he would like to pursue further information about any of the selections.

In still another embodiment, information displayed on display 1200 can be passed through a text-to-speech processor. Such a feature can be beneficial for listeners with diminished sight.

In another embodiment, radio 20 includes a printer, or at least a printer port (neither shown), which can be used to print any single selection or an entire list of selections in a format like that shown in FIG. 6. The printer can be any suitable type, including dot matrix, bubble jet, ink jet or thermal head. The printer can also be configured to print machine-readable bar codes of PIDs, which can be used at kiosks or retail outlets. The printer could also be configured to print coupons relating to goods or services being advertised or to print information about programming that is being broadcast. Of course, the broadcast itself preferably includes the information required for the substantive portion of the printing.

Media Link:

Employing a physical media link 1140 such as a flash memory card simplifies the transferring of program identifiers from radio 20 to computer 1150 or kiosk 1180. In this case, every time a listener presses select button 1220, the program identifier associated with the content being played at that time is stored on media link 1140. Media link 1140 is then, as described previously, taken to a reader, which is preferably connected to computer 1150 or associated with kiosk 1180, and the information stored thereon is downloaded so that the user may proceed with purchase of a product, obtain further information or provide feedback regarding the content that was broadcast.

Similarly, if the listener does not want to be bothered with pressing select button 1220 each time there is content of interest or he is simply not near radio 20 to press the button, radio 20 is preferably configured to store all content listened to (as in the manual retrieval embodiment). The user can then, at his convenience, scroll through the several listings and press select button 1220 only for those segments that are of interest to him. Media link 1140 is then removed from radio 20 (i.e., slot 1240) and taken to a computer/kiosk as previously described.

Those skilled in the art will also appreciate that low power transmitter 600 may be employed to transfer program identifiers (as well as other related information) to media link 1140. For example, a wireless device such as a Palm VII™ could be used to receive, via low power transmitter 600, program identifiers, as well as a unique identifier for radio 20, including an electronic serial number (ESN). Wireless technology for effecting such a transfer is well known in the art.

Wireless Link:

Some listeners might find manual retrieval and even the less burdensome physical media link retrieval inconvenient. Accordingly, another way to achieve transfer of selected program identifiers is via wireless link. In this case, when the listener selects the content segment of interest by pressing select button 1220 at the time the program segment is aired, or at a later time by pressing select button 1220 after scrolling through stored PIDs of content segments, high power transmitter 700 of radio 20 transmits program identifier information to at least one of several places.

In a first instance, the information can be sent as an email to the user s computer where it can be accessed at a later time. The email may also contain a link to web site 1170, whereby the selected program identifiers can be more easily acted upon. Alternatively, an email or message that contains both the selected program identifiers and a unique user identifier, such as a unique electronic serial number (ESN) or mobile identification number (MIN) of radio 20, can be sent directly to web site 1170. Since, the message or email contains information regarding who sent program identifiers, web site 1170 preferably can automatically respond to the user by sending additional information to, e.g., computer 1150 or to some other prearranged address.

If high power wireless module 700 is a transceiver, then information concerning the selected program identifiers can be sent directly back to radio 20 for almost immediate review by the listener. Thus, for example, if the listener wishes to purchase a product that has just been advertised, he can press select button 1220, and receive further information regarding the product such as price and availability. This information is preferably displayed on display 1200. The listener might even complete the transaction using radio 20, which, since it includes the high power wireless transceiver, can function as a conventional text pager.

In the same vein, if high power wireless module 700 is a transceiver, then a full voice connection can be established between the listener/user and a merchandiser or information outlet. Specifically, when the user presses the select button, the listener is connected with a customer representative and a conversation can ensue between the parties. Speakers associated with radio 20 preferably also function as a speaker for the voice communication. In this case, a telephone number is preferably associated with the program identifier in another portion of the content segment header, and when the select button is pressed, radio 20 is programmed to retrieve and/or buffer the telephone number to be ready to place a call to that number via high power wireless module 700. Of course, visual information may also be displayed as in the embodiment described above.

In still another variation, instead of contacting a customer representative upon pressing the select button, a call is placed to an Interactive Voice Response Unit (IVRU) that is voice activated. A listener can then easily navigate through a menu of choices using voice commands. This embodiment is particularly useful for people who may be driving while listening to the radio.

Another aspect of the present invention involves voting or sweepstakes activity. This aspect of the present invention is operable with any of the three main methods of capturing and transferring program identifiers from radio 20 to central hub 1170. If, for example, one of the channels plays a new song and it is desired to know whether listeners are enjoying the music or not, the "disc jockey" might ask listeners to press select button 1220 if they are enjoying the music. Each listener who presses select button 1220 sends the program identifier associated with the song that is being played to central hub 1170 (or passed to another computer via central hub 1170) which can tally the number of program identifiers received to determine how many listeners were enjoying the particular song. In essence, then, it is possible to provide a voting mechanism, which can be almost instantaneous if the wireless link embodiment is employed, or somewhat delayed, if the manual or media link embodiments are employed.

Similarly, a broadcast "sweepstakes" can be implemented in accordance with the principles of the present invention. Specifically, a program host or "disc jockey" might ask all listeners to press their "select" button when a particular song is played or word mentioned. Prizes and the like can be presented to all listeners who press the select button at the correct time. Again, listeners are preferably identified in the wireless link embodiment via an ESN or MIN. A radio ESN can be forwarded in the media link embodiment as well.

Significantly, since, in accordance with the present invention, feedback provided by a listener/user is often sent along with unique identification such as an ESN or MIN, it is possible to ensure that each listener is counted only once when voting or entering sweepstakes. Similarly, it is possible to exclude listeners/users who tend to abuse the system with frequent and repetitive feedback.

Targeted Advertisements:

It is also possible to implement targeted advertising using the systems and methods of the present invention. Specifically, as mentioned, each radio 20 includes a unique identifier such as an ESN. To selectively enable each radio as it is sold and to be able to disable a radio 20 if a listener fails to pay a subscriber fee, for example, at least one channel broadcast from a satellite streams a list of all radios 20 (i.e., a list of ESNs) that should be enabled. If a particular radio's ESN (or other unique identifier) is not transmitted via the satellite, that radio is precluded from playing satellite radio broadcasts. Thus, in order to enable and disable particular radios 20, the SDARS operator preferably maintains a listing of all radio 20 listeners/users.

In accordance with the present invention, the listing of listeners/users is expanded to include demographic (e.g., age, income, product preferences, etc.) and geographic information (e.g., city, state, region, etc.) about each listener/user. Then, via one or more separate control channels, the SDARS operator preferably enables reception of selectable advertisement material (or even special programming) for groups of listeners/users that have similar demographic and/or geographical characteristics. This can be accomplished by transmitting a stream of advertisement (or other programming) on a "side" channel that is not normally heard by all listeners. Breaks in programming blocks on regularly listened-to channels are then timed or synchronized to coincide with the beginning of an advertisement or specialized programming broadcast on the side channel. At the appropriate time, a control channel enables selected radios 20 to tune to the side channel and thus receive targeted broadcasts. Accordingly, it is possible to target specific groups of listeners/users with specialized advertising and/or programming.

Of course, it should be understood that geographic characteristics may not be accurate in that listeners/users may receive the satellite broadcast in virtually any part of the United States. At the very least, however, it is possible to determine an initial geographic location for each listener/user based, for example, on billing information in the listing of listeners/users, or based on the location of purchase of radio 20.

For a more accurate determination of geographic characteristics, if the wireless link embodiment described above is implemented, updated geographic information can be gleaned from the cellular system through which wireless communication is taking place. Similarly, radio 20 may also incorporate global positioning system (GPS) equipment, which can provide geographic data back to the listing of listeners/users (e.g. via a cellular system), thereby resulting in fully updated and current geographic data for effecting accurate and effective targeted advertising or programming.

Enabling/Disabling Mobile Commerce:

It is also within the scope of the present invention to control whether a particular listener/user should be given continued access to the various mobile commerce features. As described above, abusive listeners/users can be excluded from being counted in voting and sweepstakes. That is, it is possible to disable the entire mobile commerce feature of the present invention in any one of three places. First, the mobile commerce features can be disabled at radio 20. This is preferably accomplished via a control channel broadcast from at least one satellite 12, 14 in the same manner as enabling/disabling the ability to receive or listen to the SDARS in the first place. Second, to disable the mobile commerce features in the media link embodiment, hub 1170 preferably blocks or filters any incoming communication from selected listeners/users. Finally, in the wireless link embodiment, the cellular radio system supporting interactive communication is configured to block or filter calls coming from selected radios 20. Of course, the described blocking or filtering can be removed at any time by the SDARS operator, thereby enabling, or reenabling the mobile commerce features of the present invention for particular listeners/users.

User Monitoring:

Another feature of the present invention concerns monitoring which channels are being listened to. The present invention contemplates recording all programming segments that are listed in a format depicted in FIG. 6. Thus, it is possible not only to send user selected program identifiers back to central hub 1170, but it is also possible to send the entire play list stored in the table of FIG. 6. Central hub 1170 or another entity can then gather the data and conduct analyses to learn about the listening habits of users.

Information Storage:

In another embodiment of the present invention, instead of, or in addition to, receiving information directly from web site 1170 or via a wireless link, the digital radio broadcast includes detail information (other than program identifiers) associated with selected program segments. This detail information is preferably stored in non-removable memory 500 or other memory that is in communication with radio 20, but is not played in realtime with the rest of the broadcast. When a listener desires to learn more about a program segment that is being heard, he presses select button 1220, which causes the stored detail information to be played or displayed.

For example, an advertisement for a new CD is preferably broadcast along with detail information regarding its price. When the listener presses select button 1220, the CD pricing is displayed on display 1200 or is played concurrent with or instead of what is being played at that moment.

The detail information can be broadcast on a side-channel or in an auxiliary data field of the channel that is being listened to.

Mobile Commerce Revenue Generation

In supporting mobile commerce for a consumer, the present invention also provides the administrator of the system (i.e., the broadcaster and/or operator of web site 1170) with unique methods for generating revenue. The sources of this revenue can include fees for broadcasting advertisements, sales commissions, fees for advertising on the web site of the administrator, profits from sales directly from the system administrator to a consumer, and subscriber fees for mobile commerce enabled services.

Broadcast Advertisement Fees:

In one embodiment of a method for generating revenue, the system administrator charges retailers for broadcasting advertisements. Unlike traditional broadcast advertising fees, which are typically a flat fee based on such factors as the length of the commercial and the projected size of the audience, the present invention enables a system administrator to base broadcast charges on the number of consumers who indicate interest in the advertisement.

In the memory device embodiment (i.e., the embodiment using media link 1140), the web site of the system administrator determines the number of interested consumers based on the number of consumers who download a selection from media link 1140 to the system administrator's web site. For example, during the broadcasting of an automobile commercial, users interested in the automobile would push select button 1220 to record the program identifier of that commercial. (The act of pushing select button 1220 is one example of an "electronic indication.") Later, each user would remove media link 1140 from his radio, would connect media link 1140 to a computer, and would communicate with the web site of the administrator to download the program identifier and pursue further interaction with the sponsor of the commercial (e.g., to obtain more information about the automobile or to arrange a purchase). Downloading the program identifier to the web site of the system administrator gives the system administrator the opportunity to count the number of consumers who responded to the advertisement. Thus, for example, the system administrator could charge a fixed fee for each download.

In the wireless embodiment (i.e., the embodiment using high power wireless module 700), which does not use media link 1140, the system administrator determines the number of interested consumers based on the number of select buttons pushed during the airing of an advertisement. For example, during the airing of a vitamin advertisement, users would push select button 1220 to purchase the vitamin product or to receive more information about the product, for example, through a mailed brochure. (Again, the pushing of select button 1220 is an example of an "electronic indication.") The advertisement itself could specify what users can accomplish by pushing select button 1220. After select button 1220 is pushed, the system administrator would immediately receive the user's order through a wireless network. The order would include the program identifier associated with the vitamin advertisement and some type of user identification (e.g., an ESN). Thus, for example, the system administrator could charge a fixed fee for each button pushed.

Advertising fees based on the number of interested consumers are especially attractive to retailers because the retailer only pays for advertising that it knows has influenced the consumer. Whereas the traditional advertising fees depend on ratings or audience size, which may or may not correlate to interested consumers, the broadcast advertising fees of the present invention reflect the actual number of consumers who have heard the advertisement, understood the advertisement, and have indicated an interest in learning more about the advertised product or buying the advertised product.

The audience feedback provided by this method is also extremely valuable to a retailer. A retailer could, for example, evaluate responses to an advertisement running at different times to determine the best time to air the advertisement. The retailer could also run different advertisements at the same time to compare the effectiveness of each advertisement. In addition, the retailer could compare the same advertisement aired in different programming markets, as represented by the variety of channels on a satellite radio broadcast. For example, a retailer may determine that a vitamin commercial aired on a sports-talk channel sparks more listener interest than the same commercial aired on a modern jazz music channel.

The form in which the audience feedback is compiled can be as simple as the number of interested consumer responses. Alternately, the feedback could include demographic information, by correlating each user response with the user's account information. The account information would be recorded by the system administrator upon registration for the service, and would include data such as the user's age, state of residence, average annual income, and occupation. Either the system administrator or retailer could compile this information. However, to address privacy concerns, it is preferable that the system administrator compile the demographic information and present the overall results to the retailer, keeping the individual user account information confidential.

The program identifier plays a vital role in facilitating this embodiment for generating revenue by charging only for actual consumer response. The program identifier enables the system administrator to match a consumer's response with a specific content segment. In effect, the program identifier provides a traceable link from the consumer's first exposure to the advertisement through to the consumer's interaction with the sponsor of the advertisement. With conventional broadcast technologies, such correlation is impossible, other than perhaps asking a consumer to "mention the ad" when contacting the sponsor of the advertisement. This inferior method, however, is unreliable for the purpose of basing revenue for the system administrator on the number of interested consumers.

Sales Commissions:

In another embodiment of a method for generating revenue, rather than consumer responses, the system administrator can collect commissions on final sales derived from advertisements, using the program identifiers as a tracking tool. As discussed above, the advertisements include program identifiers by which the system administrator can put interested consumers in contact with the retailer that sponsored the advertisement. This contact can include directing the consumer to the system administrator's web site to purchase the retailer's product, or can include hyperlinks to the retailer's own web site, where a consumer can obtain more information and, perhaps, purchase a product. In either case, according to this embodiment, the system administrator can charge a percentage of the profits on product sales derived from specific advertisements.

The program identifier makes this revenue stream possible. In the ordinary course of business, a broadcasting company would have no way of connecting its advertisement with the sale of an individual product. With the system and method of the present invention, however, the program identifier that is broadcast with the advertisement traces a consumer's interaction with the retailer from his initial indication of interest (i.e., pushing select button 1220 on radio 20) through to his eventual purchase of the product.

Web Site Advertisement Fees:

In another embodiment of a method for generating revenue, the system administrator can derive further revenue through advertising on its web site. In the process of establishing an interaction between an interested consumer and a retailer, the system administrator can pass the consumer through its central web site, on which other related advertisements could be displayed, for example, in the form of banner advertisements and other click-through links. For example, if a user indicates interest in an advertisement for a camping tent, while downloading the program identifier for that advertisement to the system administrator's web site, the web site could display other advertisements for camping equipment, sold by the sponsor of the camping tent advertisement or by other retailers. The user could purchase the tent and then click-through the additional advertisements to shop for more camping gear.

In this revenue generating method, the system administrator could charge for the initial placement of these related advertisements on its web site. In addition, the system administrator could use the program identifier to facilitate other unique fee structures for a single retailer or between retailers selling related products. Importantly, the program identifier enables the system administrator to track all of a consumer's responses resulting from a single broadcast advertisement. Specifically, the system administrator would pass the program identifier with each click-through of a related advertisement, such that the program identifier is associated with each purchase stemming from the advertisement.

For instance, in the case in which the related advertisements shown on the web site are sponsored by the same retailer that sponsored the broadcast advertisement, the system administrator could charge the retailer a commission for each sale that resulted from the advertisement. Thus, in the camping example, if a consumer, after hearing the advertisement, buys the tent and then shops for and purchases sleeping bags and lanterns through banner advertisements shown on the system administrator's web site, the system administrator can charge the camping gear retailer for a commission on the sale of the tent, sleeping bags, and lanterns. Presumably, the retailer would be happy to pay these commissions, knowing that the advertisement it placed led directly to the sales. In this example, the program identifier would be associated with each purchase initiated through the banner advertisements.

As another example, for the case in which the related advertisements shown on the web site are sponsored by different retailers, this embodiment of the present invention could facilitate a sharing of the advertising costs between retailers. For instance, the broadcast advertisement could promote the products of several different retailers selling related products. A consumer who indicates interest (i.e., pushes the button) in this "portal" advertisement would be directed to the system administrator's web site on which each of the retailers' click-through advertisements is displayed. By tracking purchases with the program identifier, the system administrator would charge each retailer a commission for sales derived from the portal advertisement. In this manner, the retailers participating in the portal advertisement can share the cost of the portal advertisement, but only to the extent that the advertisement directly benefits them, i.e., to the extent that it produces sales.

Profits from Sales Directly from the System Administrator to a Consumer:

In this embodiment of a method for generating revenue, the system administrator collects revenue for content purchased by users. For example, if a user pushes the button during a content segment on a comedy channel, the system administrator can sell that content segment directly to the consumer. The program identifier enables the system administrator to identify the particular comedy content that the user desires and to sell that segment to the user. The system administrator's profit on such a transaction would be the purchase price minus the cost to produce and deliver the content to the user.

Profits from Subscription Fees:

In this embodiment of a method for generating revenue, the system administrator collects fees paid by subscribers for mobile commerce (or e-commerce) enabled services. That is, users will gladly pay for the convenience and advantages of the mobile commerce & e-commerce services made possible via a satellite radio system. These subscription fees can be collected in any known manner, such as by monthly billing, automatic account debiting or in accordance with well-known pre-paid schemes.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
receiving a broadcast at a radio receiver having an RF tuner module and a separate high power wireless transceiver, the broadcast comprising programs and unique identifiers relating thereto;
automatically storing in the radio receiver a plurality of the unique identifiers that uniquely identify respective programs as they are received with the broadcast and before a user has selected one or more of the programs to be of interest;
receiving user input indicating an interest in a given one of the programs after automated storage of its corresponding program identifier;
in response to said user input, transmitting, from said high power wireless transceiver to at least one location, a message comprising the stored program identifier corresponding to the given one of the programs; and
receiving, in response to said message, information related to said given one of the programs via at least one of said radio receiver and said high power wireless transceiver.

2. The method of claim 1, wherein the broadcast is a satellite broadcast.

3. The method of claim 1, wherein the broadcast is a satellite digital audio radio system (SDARS) broadcast.

4. The method of claim 1, further comprising including in the message an electronic serial number (ESN) or a mobile identification number (MIN) associated with said high power wireless transceiver.

5. The method of claim 1, further comprising detecting a button selection on the radio receiver as said user input.

6. The method of claim 1, further comprising transmitting said message while said given one of the programs is being broadcast.

7. The method of claim 1, further comprising transmitting said message at a time subsequent to when said given one of the programs is broadcast.

8. The method of claim 1, wherein the information is received at a user computer.

9. The method of claim 1, wherein the information is sent to a prearranged address.

10. The method of claim 1, wherein the information includes a price of a product or service.

11. The method of claim 1, wherein the information includes availability information for a product or service.

12. The method of claim 1, further comprising displaying the information on said radio receiver.

13. The method of claim 1, further comprising establishing a voice connection with a merchandiser or information outlet via said radio receiver and high power wireless transceiver.

14. A radio for use in an interactive communications system, comprising:
a system controller;
a channel decoder and an audio decoder in communication with the system controller for receiving a broadcast comprising segments and unique identifiers relating thereto;
a memory for automatically storing the unique identifiers that identify respective segments as they are being received with the broadcast and before a user has selected one or more of the segments to be of interest;
a high power wireless transceiver in communication with the system controller; and
a user interface in communication with the system controller,
wherein the system controller detects user input indicative of interest in a segment of a broadcast received by the radio via the channel decoder and audio decoder, the user input being detected after automated storage of the program identifier corresponding to the segment, and in response to said user input, the system controller causes the high power wireless transceiver to send a message comprising the stored program identifier corresponding to the segment to which a response is received that includes information related to the segment of the broadcast.

15. The radio of claim 14, wherein the broadcast is a satellite broadcast.

16. The radio of claim 14, wherein the message includes an electronic serial number (ESN) or a mobile identification number (MIN) associated with the high power wireless transceiver.

17. The radio of claim 14, wherein the user interface comprises a button that is operable to provide the user input.

18. The radio of claim 14, wherein the message is sent while the segment of the broadcast is being broadcast.

19. The radio of claim 14, wherein the message is sent after the segment of the broadcast is broadcast.

20. The radio of claim 14, wherein the information related to the segment of the broadcast is output via at least one of displayed on a display of the radio and announced over speakers of the radio.

21. The radio of claim 14, further comprising an interface for removable memory.

22. A communications system, comprising:
a first communications network that broadcasts content comprising segments and unique identifiers relating thereto;
a plurality of radios that are each adapted to receive the content from the first communications network and automatically store the unique identifiers that identify respective segments as they are being received with the broadcast and before a user has selected one or more of the segments to be of interest; and
a second communications network that is adapted to establish bi-directional communication between a given one of the plurality of radios and a predetermined location,
wherein the radio is configured to generate a message in response to receiving user input at the radio indicating an interest in a selected one of the segments being received with the broadcast, the user input being received after automated storage of the program identifier corresponding to the selected segment, the message comprising the stored program identifier corresponding to the selected segment, and
wherein information related to the selected segment is provided to the radio over the second communications network in response to the message transmitted from the radio over the second communications network.

23. The system of claim 22, wherein the first communications network is a satellite broadcasting network.

24. The system of claim 22, wherein the second communications network is a wireless telecommunications network.

25. The system of claim 22, wherein the message contains an electronic serial number (ESN) or mobile identification number (MIN).

26. The system of claim 22, wherein a voice connection is established over the second communications network.

27. The system of claim 22, wherein the information comprises at least one of a copy of the selected segment, price information for a product or service, and availability information for a product or service.

28. The system of claim 22, wherein user input received from any of a plurality of the radios is transmitted via the second communications network to a hub and used to perform at least one of advertising to targeted ones of the radios based on their corresponding user inputs, monitoring of the user inputs for determining results from at least one of voting and sweepstakes entries by the user inputs, and determining advertisement fees based on the user inputs related to a corresponding advertisement.

29. The method of claim 1, wherein the broadcast comprises plural channels and each of the channels comprises programs and their corresponding program identifiers, and automatically storing comprises automatically storing the program identifiers corresponding to a plurality of the programs on at least one of the channels as they are being received in the broadcast and before a user has selected one or more of the programs to be of interest.

30. The radio of claim 14, wherein the broadcast comprises plural channels and each of the channels comprises segments and their corresponding program identifiers, and automatically storing comprises automatically storing the program identifiers corresponding to a plurality of the segments on at least one of the channels as they are being received in the broadcast and before a user has selected one or more of the segments to be of interest.

31. The system of claim 22, wherein the broadcast comprises plural channels and each of the channels comprises segments and their corresponding program identifiers, and automatically storing comprises automatically storing the program identifiers corresponding to a plurality of the segments on at least one of the channels as they are being received in the broadcast and before a user has selected one or more of the segments to be of interest.

* * * * *